United States Patent [19]

Lam

[11] Patent Number: 5,960,464
[45] Date of Patent: Sep. 28, 1999

[54] MEMORY SHARING ARCHITECTURE FOR A DECODING IN A COMPUTER SYSTEM

[75] Inventor: Christopher S. Lam, San Jose, Calif.

[73] Assignee: STMicroelectronics, Inc., Carrollton, Tex.

[21] Appl. No.: 08/701,890

[22] Filed: Aug. 23, 1996

[51] Int. Cl.[6] .................................................. G06F 12/10
[52] U.S. Cl. ......................................................... 711/206
[58] Field of Search ................................... 711/202, 203, 711/206, 207; 395/846; 710/22

[56] References Cited

U.S. PATENT DOCUMENTS

| 5,263,142 | 11/1993 | Watkins et al. ........................... 395/842 |
| 5,301,287 | 4/1994 | Herrell et al. ............................ 711/202 |
| 5,459,519 | 10/1995 | Scalise et al. ............................ 348/431 |

FOREIGN PATENT DOCUMENTS 0 673 171 A2  9/1995  European Pat. Off. .

OTHER PUBLICATIONS

Bheda, H. and P. Srinivasan, "A High–Performance Cross–Platform MPEG Decoder," *Digital Video Compression on Personal Computers: Algorithms and Technologies*, vol. 2187, Feb. 7–8, 1994, pp. 241,248.

Bursky, D., "Highly Integrated Controller Eases MPEG–1 Adoption," *Electronic Design*, vol. 43, No. 17, Aug. 21, 1995, pp. 141–142.

Galbi, D. et al., "An MPEG–1 Audio/Video Decoder With Run–Length Compressed Antialiased Video Overlays," *1995 IEEE International Solid–State Circuits Conference*, pp. 286–287, 381.

Maturi, G., "Single Chip MPEG Audio Decoder," *IEEE Transactions on Consumer Electronics*, vol. 38, No. 3, Aug. 1992, pp. 348–356.

Butler, B. and T. Mace, "The Great Leap Forward," *PC Magazine*, Oct. 11, 1994, pp. 241–244, 246, 248, 250, 253–254, 256, 260–261, 264, 266–268, 273–275, 278.

Doquilo, J., "Symmetric Multiprocessing Servers: Scaling the Performance Wall," *Infoworld*, Mar. 27, 1995, pp. 82–85, 88–92.

Video Electronics Standards Association, "VESA Unified Memory Architecture Hardware Specifications Proposal," Version: 1.0p, Oct. 31, 1995, 1995, pp. 1–38.

(List continued on next page.)

Primary Examiner—Eddie P. Chan
Assistant Examiner—Kevin L Ellis
Attorney, Agent, or Firm—David V. Carlson; Theodore E. Galanthay; Lisa K. Jorgenson

[57] ABSTRACT

A method and apparatus employing a memory management system that can be used with applications requiring a large contiguous block of memory, such as video decompression techniques (e.g., MPEG 2 decoding). The system operates with a computer and the computer's operating system to request and employ approximately 500 4-kilobyte pages in two or more noncontiguous blocks of the main memory to construct a contiguous 2-megabyte block of memory. The system can employ, on a single chip, a direct memory access engine, a microcontroller, a small block of optional memory, and a video decoder circuit. The microcontroller retains the blocks of multiple pages of the main memory, and the page descriptors of these blocks, so as to lock down these blocks of memory and prohibit the operating system or other applications from using them. The microcontroller requests the page descriptors for each of the blocks, and programs a lookup table or memory mapping system in the on-chip memory to form a contiguous block of memory. As a result, the video decoder circuit can perform operations on a 2-megabyte contiguous block of memory, where the microcontroller employs the lookup table to translate each 2-megabyte contiguous address requested by the video decoder circuit to its appropriate page in the main memory. As soon as the video decoding operations are complete, the microcontroller releases the blocks of multiple pages of memory back for use by the computer.

40 Claims, 3 Drawing Sheets

OTHER PUBLICATIONS

Video Electronics Standards Association, "VESA Unified Memory Architecture VESA BIOS Extensions (VUMA–SBE) Proposal," Version: 1.0p, Nov. 1, 1995, pp. 1–26.

Giorgis, T., "SMP Network Operating Systems," *Computer Dealer News*, Aug. 8, 1996, pp. 42, 43.

King, A., *Inside Windows 95*, Microsoft Press, Redmond, Washington, 1994, pp. 85–90.

"MPEG Video Overview," *SGS–Thomson Microelectronics Technical Note*, Apr. 1992, pp. 1–4.

MEMORY SHARING ARCHITECTURE FOR A DECODING IN A COMPUTER SYSTEM

CROSS-REFERENCE TO RELATED APPLICATIONS

This application relates to the following U.S. Patent Applications: "VIDEO AND/OR AUDIO DECOMPRESSION AND/OR COMPRESSION DEVICE THAT SHARES A MEMORY INTERFACE" (U.S. Pat. No. 5,812, 789 issued on Sep. 22, 1998) and "VIDEO AND/OR AUDIO DECOMPRESSION AND/OR COMPRESSION DEVICE THAT SHARES A MEMORY" (U.S. application Ser. No. 08/702,910)[, and "MPEG DECODER TO BE USED IN A MICROCOMPUTER" (Attorney's Docket No. 95-GR2-041), all] filed concurrently herewith.

TECHNICAL FIELD

The present invention relates to the field of electronic systems requiring blocks of memory, and is more specifically directed to systems employing decompression devices, such as audio and/or video decompression.

BACKGROUND OF THE INVENTION

In the past, moving images were transmitted via analog signals, such as television signals. To improve signal to noise ratio and improve security, while also potentially providing additional signals over a given channel, moving images are digitized and transferred digitally. The size of a digital representation of moving images (i.e., video) is dependent on the resolution of the image. If a display device, such as a CRT, has a resolution of 1024×768 picture elements (pels or pixels), where each pixel can have an 8-bit color value, one image requires approximately ¾ of a megabyte of memory. At a minimum, 30 images must be displayed per second, thereby requiring over 22 megabytes of memory per second. A typical 90-minute movie would thus require nearly 120 gigabytes of memory.

As a result of such need for memory to store a typical movie, digitized video is compressed using various digital compression techniques. One such technique for compressing video is the Digicypher II system by General Instruments. Such a system allows for compressed video and audio images to be transmitted over high bandwidth channels such as satellite transmission. Other known techniques for encoding/decoding video images include the Motion Picture Expert Group (MPEG) techniques MPEG 1 and MPEG 2. Current encoding/decoding standards for video telephony include the H.261 and H.263 standards.

Many of the compression/decompression standards employ the known discrete cosine transfer algorithm (DCT). The MPEG 1, MPEG 2, H.261 and H.263 standards are decompression protocols that describe how an encoded bit stream is to be decoded. As a result, the video can be encoded in any manner, as long as the resulting bit stream complies with the particular standard.

Once encoded, the images can be decoded and displayed on an electronic system dedicated to displaying video and audio, such as a television or digital video disk (DVD) player, or on electronic systems where displaying images are just one of the features of the system, such as a computer. A given electronic system must include an appropriate decoder to allow it to display digital sequences of images compressed under one of the above standards, assuming the original video was compressed using an encoder under that standard.

Current computers, such as personal computers, employ graphics or video accelerator cards that permit the computer to rapidly display static images. Personal computers are typically unable to decompress and display video images because the decompression or decoding routines typically require substantial processor overhead. For example, the MPEG 2 standard decodes 720 pixels per line and 576 lines per frame for a single image, and approximately 30 frames per second. As is known, each frame is divided into a series of 16 pixel by 16 pixel macroblocks, so that for each second, the processor must decode 48,600 macroblocks per second. Consequently, the time interval between decoding each macroblock is approximately 2.0576 microseconds. If a CPU in the PC is running at 100 megahertz, then only 2,057 clock cycles are available between decoding of each macroblock. This is an inadequate number of clock cycles to decode a given macroblock given the complexity of the decoding function under the MPEG 2 standard.

As a result, chip sets have been developed that employ a dedicated microcontroller, a MPEG 2 decompression chip, and a large amount (e.g., 2 megabytes) of memory, such as DRAM. Such chip sets can be expensive, particularly since they require 2 megabytes of DRAM. Thus, it would be desirable to employ the main memory of the computer, which typically has over 8 megabytes of DRAM.

Some applications exist that share the main memory. For example, the symmetrical multiprocessor environment (SMP) by Intel employs two or more identical processors that each access the same block of main memory. However, each of the microprocessors employs a memory management unit (MMU) that has an identical memory mapping table. Neither microprocessor can permanently allocate a portion of the main memory. Instead, as soon as one of the microprocessors no longer employs a portion of the memory, and the address of that memory is removed from its memory map, then the other microprocessor is free to use that portion of memory. Additionally, the SMP environment requires a specific operating system.

Another known method of sharing main memory is employed with graphics accelerators in personal computers. Previously, graphics or video accelerator cards included on-board memory chips. However, under the Video Electronics Standards Association (VESA), a VESA unified memory architecture (VUMA) standard has been developed. Under this standard, video accelerators can share main memory with the computer to thereby eliminate the need for on-board memory for the graphics accelerator. During boot-up of the computer system employing the video accelerator, the video accelerator will cause the basic input/output instructions (BIOS) of the computer to reserve a large portion of contiguous memory in the main memory, and prohibit the operating system or other applications from accessing or employing that memory.

However, typical operating systems such as Windows 95®, manufactured by Microsoft Corporation, do not permit large blocks of memory to be permanently allocated for a given application or operation after booting up the computer. Instead, Windows 95 dynamically allocates memory to an application based on the need of that application. As soon as the application no longer uses the memory, Windows 95 allocates that memory to another application. Moreover, MPEG 2 decoding requires 2 megabytes of contiguous memory. Windows 95 allocates small blocks of memory (typically "pages" of 4 kilobytes each) that are scattered throughout the main memory.

SUMMARY OF THE INVENTION

One solution the inventor has developed would be to initialize the computer during the boot-up process to reserve a 2 megabyte portion of contiguous memory, as is performed with video accelerators under the VUMA standard. Such an allocation of memory, however, is awkward, and therefore undesirable by users. Additionally, such a solution would prohibit "on-the-fly" display of video information on the computer. Instead, the computer must be rebooted whenever the computer wishes to use the 2 megabyte portion for other applications.

The present invention solves problems inherent in the prior art and in the inventor's above solution, and provides additional advantages, by employing a memory management system that operates with the computer and its operating system (e.g., Windows 95) to request and employ approximately 500 4-kilobyte pages of the main memory, some of which are in noncontiguous blocks of pages, to construct a single contiguous 2-megabyte block of memory. The system retains the multiple pages of memory, and their page descriptors, so as to lock down these portions of memory and prohibit the operating system or other applications from using them. The memory management system can be employed on a single chip having a direct memory access (DMA) engine, a microcontroller, a small block of memory (optional), and a video decoder circuit (e.g., an MPEG 2 decoder circuit).

The microcontroller, performing a Windows 95 memory allocation application, requests the page descriptors for each block of 4-kilobyte pages. Each of the page descriptors is then stored in the form of a lookup table in the on-chip memory to form a contiguous block of memory. As a result, the video decoder circuit can perform operations on what appears to be a 2-megabyte continuous block of main memory, where the microcontroller employs the lookup table to translate one of the 2-megabyte contiguous addresses to its appropriate page in the main memory. As soon as the video decoding operations are complete, the microcontroller releases the multiple pages of memory back to the computer.

Broadly stated, the present invention embodies a control circuit for use in a computer system. The computer system is controlled by an operating system and has a main memory. An electronic device is coupled to the processor and the main memory and is configured to request continuous use of several portions of the main memory from the operating system. The memory portions can have noncontiguous addresses. The control circuit is also configured to translate the noncontiguous addresses to contiguous addresses of a block of memory, wherein the control circuit permits access to the portions of the main memory as the block of memory based on the contiguous addresses.

Broadly stated, the present invention also embodies a memory management method for use with the computer system. The memory management method includes the steps of: (a) requesting continuous use of several portions of the main memory from the operating system, the portions of the main memory having noncontiguous addresses; (b) receiving requests for access to a block of memory, the block of memory having contiguous addresses; and (c) translating the contiguous addresses to the noncontiguous addresses.

Overall, the present invention is applicable to any application requiring a large block of contiguous memory, not necessarily video decoding. Other features and associated advantages of the present invention will become apparent from studying the following detailed description, together with the accompanying drawings.

DETAILED DESCRIPTION OF THE PRESENTLY PREFERRED EMBODIMENT

Figure 1:
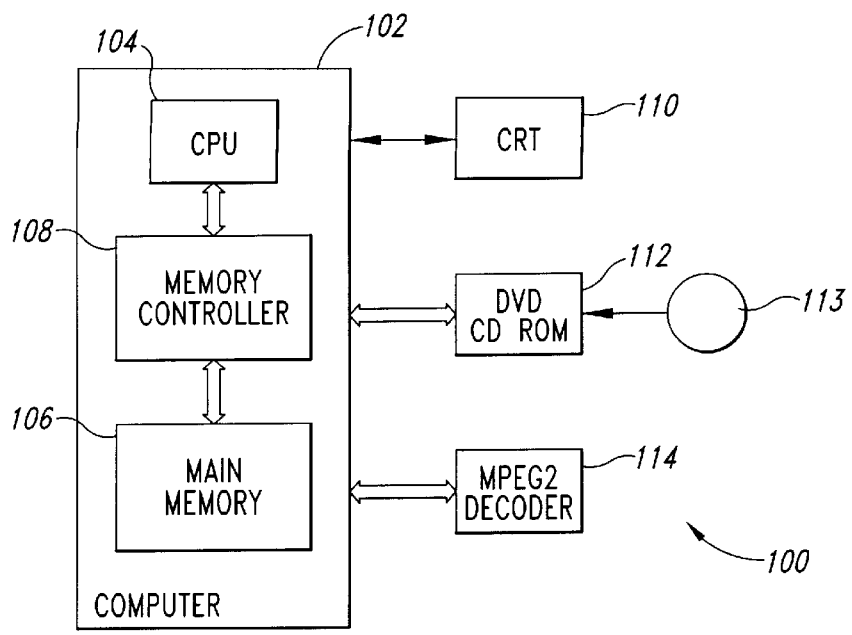
FIG. 1 is a block diagram of a computer system having an MPEG 2 decoder under the present invention.

Referring to FIG. 1, a computer system 100 under the present invention includes a computer 102, such as a conventional personal computer (PC). The computer 102 includes a central processing unit (CPU) 104, which can be an X86 based microprocessor. The CPU 104 communicates with a large block of main memory 106 through a memory controller 108. As will be understood below, the main memory 106 should include at least approximately 4 megabytes of memory (typically random access memory (RAM)).

A visual display device, such as a CRT 110, displays output produced by the computer 102. A digital video disk (DVD) compact disk-read only memory (CD-ROM) player 112, coupled to the computer 102, plays back video images to the computer from a DVD CD-ROM disk 113, which can be displayed on the CRT 110. The DVD CD-ROM disk 113 is a super-density disk that can hold up to 18 gigabytes of audio, video and other types of data (eg., menus in various languages, sub-pictures, graphics, etc.). Specifically, the DVD CD-ROM player 112 retrieves video images that have been compressed under known video compression techniques such as the MPEG 2 technique.

An MPEG 2 decoder 114, coupled to the computer 102, decodes the compressed video images from the DVD CD-ROM player 112 to reconstruct the original, uncompressed video images so that they can be displayed on the CRT 110. The DVD CD-ROM player 112 can also provide compressed audio sequences which the MPEG 2 decoder 114 decodes using known audio decompression techniques (e.g., Dolby AC-3). The computer system 100 of FIG. 1 can also contain other peripherals and elements, not shown, such as a hard disk drive, tape drive, input devices such as a keyboard or mouse, etc.

Figure 2:
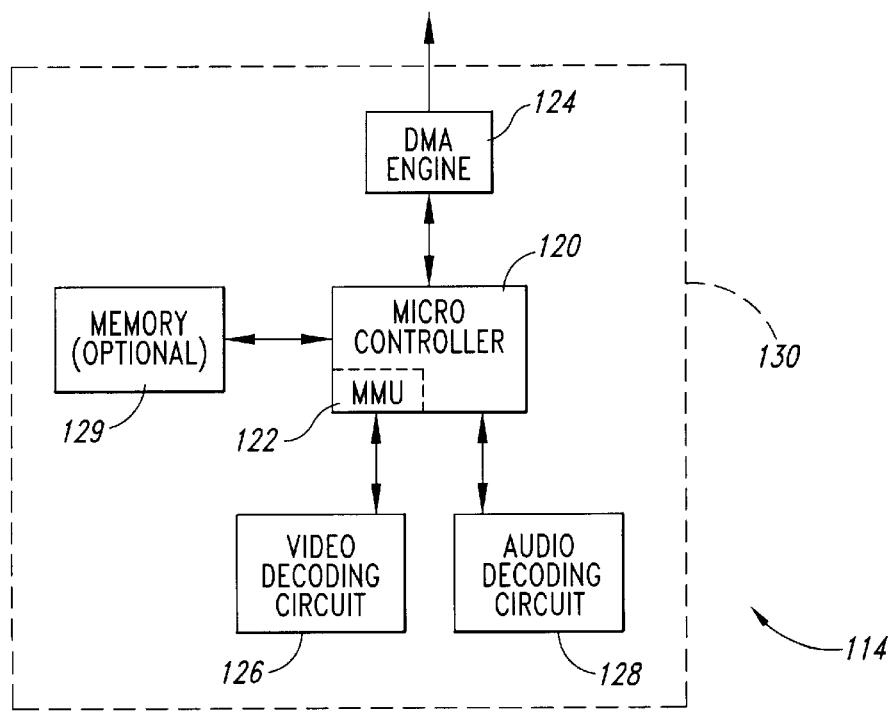
FIG. 2 is a block diagram of the MPEG 2 decoder of FIG. 1.

Referring to FIG. 2, the MPEG 2 decoder 114 is shown in greater detail. A microcontroller 120 having a memory management unit 122 (MMU) operates under a routine described below to decode audio and video from the DVD CD-ROM player 112. A direct memory access (DMA) engine 124 coupled between the microcontroller 120 and the computer 102 allows the microcontroller to directly access the main memory 106, without employing the CPU 104. The DMA engine 124 can form part of a video module interface (VMI). The DMA engine 124 and VMIinterfaces are conventional, and are not described in detail herein for purposes of brevity and so as not to obscure the detailed description of the present invention.

A video decoding circuit 126, coupled to the microcontroller 120, decodes or decompresses the video images stored on the DVD CD-ROM disk 113 in the DVD CD-ROM player 112. Preferably, the video decoding circuit 126 employs conventional MPEG 2 decoding techniques. Alternatively, or in addition, the video decoding circuit 126 can decode video images compressed under the MPEG 1, JPEG, H.261, or other known video compression techniques. In general, the MPEG compression standard is described in SGS-Thomson Microelectronics, Technical Note, MPEG Video Overview, April 1992.

An audio decoding circuit 128 similarly decodes audio compressed on the DVD CD-ROM disk 113 in the DVD CD-ROM player 112. The audio decoding circuit 128 preferably employs known audio decoding techniques, such as the Dolby AC-3 technique. The video decoding circuit 126 and audio decoding circuit 128 are of conventional construction, and are not described in detail herein for purposes of brevity and so as not to obscure the detailed description of the present invention.

An optional memory 129, coupled to the microcontroller 120, provides storage for a lookup table or memory map, as described below. The microcontroller 120, DMA engine 124, video decoding circuit 126, audio decoding circuit 128, and memory 129 can be monolithically integrated as a single chip 130 for use with or in the computer system 100.

Figure 3:
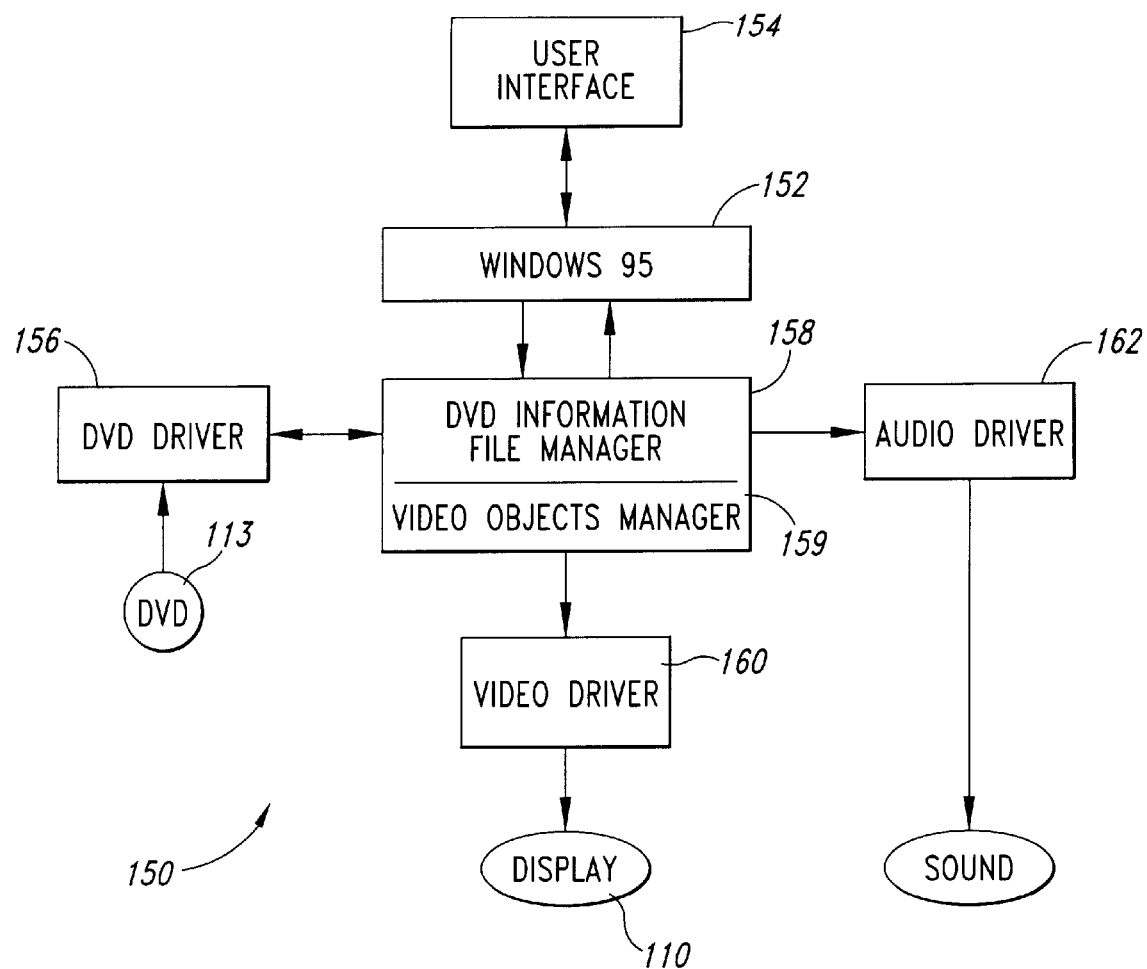
FIG. 3 is a block diagram of software elements employed by the computer system of FIG. 1.

Referring to FIG. 3, the computer 102 preferably operates under the conventional Windows 95 operating system 152. A user interface 154, forming a high-level part of the Windows 95 operating system 152, provides an interface to a user of the computer system 100. The Windows 95 operating system 152 provides services for the user interface 154 and "hooks" for all drivers to permit operation therewith. Execution process of drivers and other application programs start from the user interface 154. Upon request by such programs, a first menu appears to the user on the CRT 110, allowing the user to select menu items to initiate sequences of events performed by the application, such as initiating viewing of a movie stored on the DVD D-ROM disk 113.

A DVD driver 156 employs the hooks of the operating, system 152 and routes data from the DVD CD-ROM disk 113 to a DVD information file manager 158 and video objects manager 159. In general, there are two basic levels of data structures on the DVD CD-ROM disk 113, a volume information file which keeps track of the physical locations of lower level data structures, and video objects which contain data packets for all types of data. Physical locations of data on the DVD CD-ROM disk 113 are provided in terms of sectors, each being 2048 bytes long. The DVD driver 156 essentially performs the task of reading data from the DVD CD-ROM disk 113. The DVD information file manager 158 provides the DVD driver 156 with a physical disk location and a length of data. The DVD driver 156, in turn, transfers the requested data from the DVD CD-ROM disk 113 to a known location in the main memory 106, as described below.

The DVD information file manager 158 reads the volume information file from the DVD CD-ROM disk 113 to determine the physical locations of video titles, menu titles for each language, title attributes, etc. that are stored on the disk. In general, the DVD information file manager 158 controls the playback of video from the DVD CD-ROM disk 113 by requesting data therefrom through the DVD driver 156, and sending the data to the video objects manager 159 for display on the CRT 110. Once a user makes a selection through the user interface 154, the DVD information file manager 158 looks up the location of the appropriate video information from the volume information file. The DVD information file manager 158 continuously reads the video objects from the DVD CD-ROM disk 113 and sends the objects to the video objects manager 159. The data transfer rate changes according to the bit rate needed for the display of the particular video images. In other words, the DVD information file manager 158 is an upper level traffic controller that recognizes the type of data that is read from the DVD CD-ROM disk 113. Based on the type of data, the DVD information file manager 158 either processes user input from the user interface 154, or plays or pauses video and audio from the DVD CD-ROM disk 113.

The video objects manager 159 is a lower level traffic controller responsible for the parsing of different packets of video, and time synchronization for video and audio "lip synching." Each video object contains video, audio, sub-picture data, and other data as appropriate. The video and audio packets contain MPEG 2 elementary video stream and system information, i.e., presentation time stamps, scrambling control, clock data, etc., as is known in the MPEG 2 standard. The video objects manager 159 parses the packets and provides appropriate synchronization. The video objects manager 159 routes the video packets to a video driver 160, and routes the audio packets to an audio driver 162. In sum, the video objects manager 159 is a system coordinator. As long as the video objects manager 159 obtains data from the DVD driver 156, it routes the data to the appropriate video and audio drivers 160 and 162.

The video driver 160 decodes the video under the MPEG 2 technique. Likewise the audio driver 162 decodes the audio packets under the Dolby AC-3 technique, or other techniques. The video driver 160 and audio driver 162 can be implemented as a combination of both hardware and software elements. The video driver 160 outputs video to the CRT 110, while the audio driver 162 outputs sound to a speaker (not shown).

In operation, the DVD information file manager 158 retrieves menu data from the DVD CD-ROM disk 113, through the DVD driver 156, to display a menu through the user interface 154 on the CRT 110. A user inputs a request, which is received by the DVD information file manager 158 that in response thereto, allocates a location and number of sectors on the DVD CD-ROM disk 113 and requests the appropriate information from the DVD driver 156. The DVD driver 156 then reads the appropriate information from the DVD CD-ROM disk 113 and transfers the video objects data, and/or other data, to the DVD information file manager 158.

The video objects manager 159 parses the video objects into video, audio, sub-picture and other data packets. The video objects manager 159 transfers the video and audio packets to the video and audio drivers 160 and 162, respectively, under synchronism according to time stamps. The video driver 160 then employs known MPEG 2 decoding techniques to decode the video and display it on the CRT 110. Similarly, the audio driver 162 employs known Dolby AC-3 techniques to decode the audio packets and play them back over the speaker. The decoding of audio and video continues until a break occurs, or the user interrupts the process by a user command to the user interface 154.

Importantly, the MPEG 2 decoding technique, performed at least in part by the video driver 160, requires 2 megabytes of memory because of temporal compression employed by the technique to compress information and eliminate redundancy therein. The MPEG 2 encoding technique refers to previous and future pictures to encode a current picture. As a result, the MPEG 2 decoding technique must refer to previous and future pictures to decode a current picture. Thus, the MPEG 2 technique must store at least two images (past and future) to generate a current image. While prior MPEG 2 decoding circuits employed dedicated memory, the present invention shares the main memory 108 with the computer 102.

Figure 4:
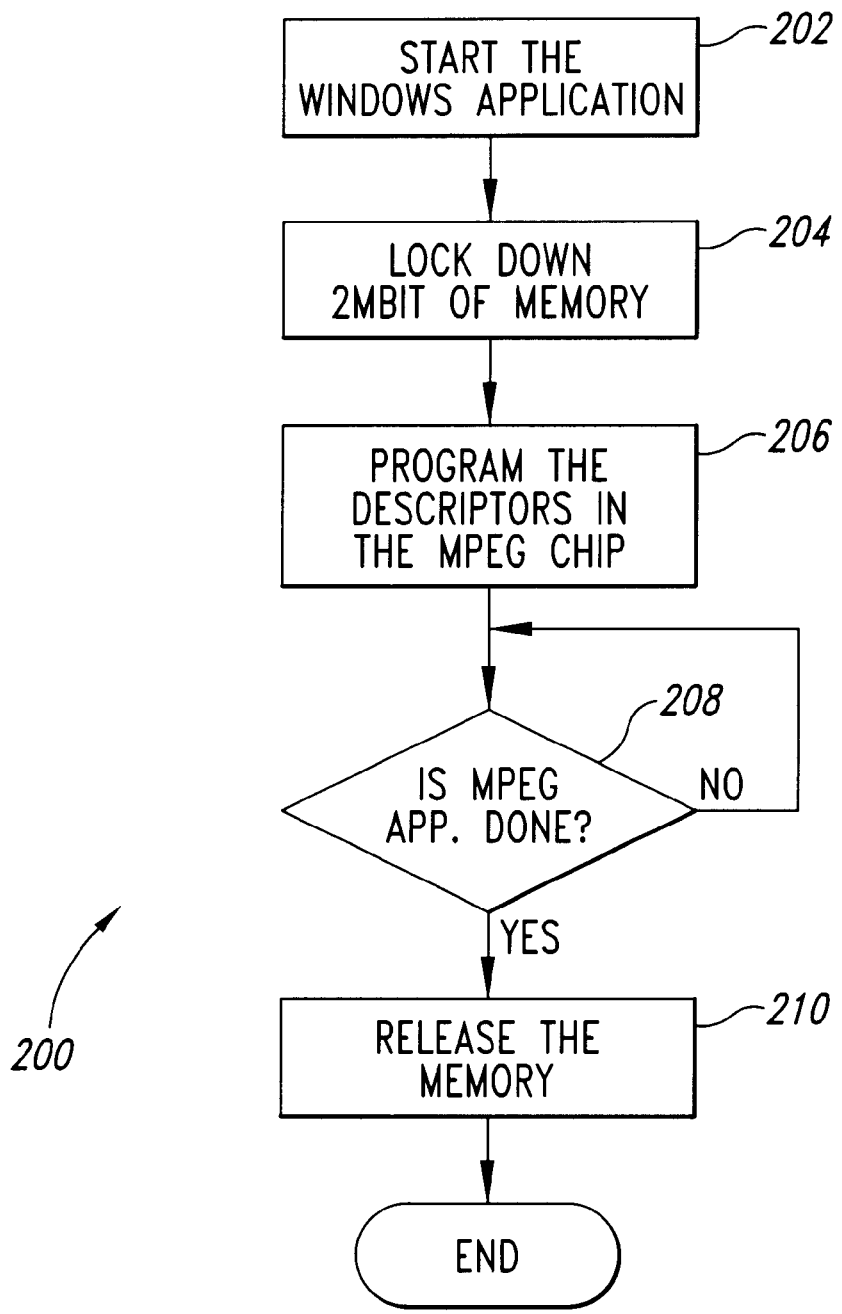
FIG. 4 is a flowchart of a routine performed by the MPEG 2 decoder of FIG. 1.

Referring to FIG. 4, a memory sharing routine 200 performed by the microcontroller 120 (FIG. 2) operates with the Windows 95 operating system 152 (FIG. 3) to request a 2-megabyte portion of the main memory 106. The routine 200 can form part of the DVD information file manager 158

(FIG. 3). In step 202, the microcontroller 120 initiates the routine 200 as a Windows 95 -based application. Therefore, the microcontroller 120 interacts with the Windows 95 operating system 152 as a new executable application. In step 104, the microcontroller 120 requests from the Windows 95 operating system 152, 2 megabytes of the main memory 106. As is known, X86 microprocessors deal with physical memory in pages, each page being 4 kilobytes in size. Under step 204, the microcontroller 120 makes a low level ring zero function call to the Windows 95 operating system 152 to request 2 megabytes (500 total pages) of the main memory 106, some of which will be in the form of noncontiguous pages. The ring, zero function call under the Windows 95 operating system 152 provides contiguous blocks of memory based on such a call or request.

Therefore, the microcontroller 120 preferably initially requests a 2-megabyte block of the main memory 106 under a first iteration of the ring zero function call. If such a large block of memory is unavailable and the Windows 95 operating system 152 provides such an indication to the microcontroller 120, the microcontroller performs at least two more ring zero function calls to request, for example, two 1-megabyte block of contiguous memory. The process repeats under step 204, where if two 1-megabyte blocks are unavailable, the microcontroller 120 requests four 500-kilobyte contiguous blocks of the main memory 106 under four ring zero function calls to the Windows 95 operating system 152. The blocks, of course, can be of varying size.

In step 204, microcontroller 120 also requests, and receives from the Windows 95 operating system 152, pointers or page descriptors that correspond to memory locations for the blocks of memory, where the blocks have a total of 500 pages of physical memory in the main memory 106. Importantly, the routine 200 indicates to the Windows 95 operating system 152 that the routine is actively using the 500 pages of memory. As a result, the routine 200 locks down and prohibits the Windows 95 operating system 152 from using or allocating any of these pages to other applications.

In step 206, the microcontroller 120 programs a lookup table based on the page descriptors of the blocks of the 500 pages of memory. As noted above, the MPEG 2 decoding technique requires 2 megabytes of contiguous memory. Since the Windows 95 operating system 152 has provided 500 pages of memory, most of which will not be contiguous, the microcontroller 120 programs or creates a lookup table to translate or map the 500 pages to a contiguous string of memory locations beginning at a set address and increasing contiguously therefrom to an address 2 megabytes later (the "2 megabyte contiguous addresses").

As is known, page descriptors typically include an offset address and a page size that correspond to a starting address of a block of contiguous pages, and the number of pages in the block. Therefore, the lookup table need not store 2 megabytes worth of addresses to map each byte of the contiguous block to a byte in the main memory 106. Instead, in a worst case scenario, only 500 of such addresses are required, each corresponding to one of the 500 pages. However, if the Windows 95 operating system 152 provides two 1 megabyte blocks of the main memory 106 (the two blocks being contiguous within themselves), then the lookup table need only provide the equivalent of two addresses for each of the 1 megabyte blocks. Moreover, if 64-bit or double word addresses are employed by the computer system 100, then only the more significant bits or bytes must be translated or mapped under step 206. The least significant bits or bytes correspond to contiguous addresses within one or more pages, as is known in the art. As a result, a much smaller amount of memory is required for the lookup table than addresses for each 2-megabyte contiguous addresses.

To further limit the amount of memory needed to perform the routine 200, the routine can be configured to limit the smallest contiguous memory block size, and thereby limit the size of the lookup table created in step 206. For example, if the Windows 95 operating system provided the smallest blocks of memory as only blocks of two pages each (250 blocks of the main memory 106), the routine 200 can provide an indication to the user over the CRT 110, through the user interface 154, that one or more applications must be closed on the computer system 100 in order to free up larger blocks of the main memory.

The lookup table can be programmed into the memory 129 (FIG. 2). Alternatively, the memory 129 can be omitted, and instead, the memory management unit 122 can be programmed to rapidly perform such memory mapping of the noncontiguous page descriptors to the contiguous string of 2-megabyte addresses. Under such an alternative, the memory management unit 122 algorithmically maps a contiguous address to a noncontiguous address in the main memory 106. For example, if two 1 megabyte blocks of the main memory 106 were provided under step 204, the memory management unit 122 can simply perform simple mathematical operations such as addition to add the offset addresses of such 1 megabyte blocks of memory to addresses in the 2 megabyte block of contiguous memory. As a further option, the lookup table can be stored in a portion of the main memory 106. Lookup table techniques, memory mapping techniques, and the operation of memory management units are conventional, and therefore are not described in further detail herein for purposes of brevity, but would be understood to those skilled in the relevant art.

Thereafter, the microcontroller 120 receives memory read/write requests from the video decoding circuit 126 and/or audio decoding circuit 128, and converts these requests to their appropriate page descriptor addresses based on the lookup table. Employing the DMA engine 124, the microcontroller 120 then accesses the appropriate portion in the main memory 106, to write data to, and read data from, the main memory as requested by the video decoding circuit 126 or audio decoding circuit 128.

In step 208, the microcontroller 120 determines whether the DVD information file manager 158 (FIG. 3) has received an interrupt or other indication that the MPEG 2 decoding application is terminated. If not, the routine 200 continues to lock down the 2 megabytes of the main memory 106 for use by the video driver 106 in decoding video from the DVD CD-ROM disk 113 under the MPEG 2 techniques. However, if the MPEG 2 application has terminated, then in step 210, the microcontroller 120 indicates to the Windows 95 operating system 152 that the Windows application initiated in step 202 has terminated. As a result, the 2 megabytes of memory from the main memory 106 are released to the Windows 95 operating system 152.

The steps of the routine 200 can be repeated each time a request to perform MPEG 2 decoding techniques are provided. As a result, the routine 200 only uses memory (portions of the main memory 106) when MPEG 2 decoding is being performed, but frees this memory up at all other times. Therefore, the present invention is not a permanent drain on the memory usage of the computer system 100 and only uses the main memory during, video decoding. Additionally, the present invention permits on-the-fly decoding and need not require the computer 102 to be rebooted each time a large block of the main memory 106 must be continuously allocated to the MPEG 2 decoder 114.

The present invention avoids the need for additional memory to be used with the MPEG 2 decoder 114, but instead shares the main memory 106 with the computer system 100. Since the MPEG 2 decoder 114 is preferably monolithically integrated on a chip 130, only one chip needs to be incorporated into the computer system 100. This eliminates manufacturing costs, since prior art decoders required separate boards that would include an MPEG 2 decoder chip with additional memory. Such separate boards necessarily have increased assembly cost. Moreover, the MPEG 2 decoder 114 has a reduced part count, thereby resulting in reduced cost.

The present invention interacts with the Windows 95 operating system 152 to act like a software application that actively employs 2 megabytes of the main memory 106. The MPEG 2 decoder 114, however, actually employs hardware, such as the video decoding circuit 126 (that forms part of the video driver 160). The MPEG 2 decoder 114, including the video decoding circuit 126 and microcontroller 120, is not a CPU, or other processor, or Intel-based microprocessor. Instead, the circuits of the MPEG 2 decoder 114 are simply hardware devices that can be embodied in an application-specific integrated circuit (ASIC). Therefore, the MPEG 2 decoder 114 does not employ transitional look-aside buffers, or other elements to synchronize or operate coherently therewith, as with shared processors. Instead, the MPEG 2 decoder 114 is a piece of hardware emulating a software application with respect to the Windows 95 operating system 152.

Although specific embodiments of, and examples for, the present invention have been described herein for purposes of illustration, various equivalent modifications can be made without departing from the spirit and scope of the invention, as will be known by those skilled in the relevant art. The teaching provided herein of the present invention can be applied to other applications, such as hardware applications, that require 2 megabytes of memory to be allocated thereto, not necessarily video decoding applications such as the MPEG 2 technique. Additionally, the present invention can incorporate the teachings of the U.S. patents and applications described herein to provide additional functionality. For example, the present invention can employ an arbitrator between the MPEG 2 decoder 114 and the computer 102 to arbitrate use of the main memory 106, under the teachings of the application entitled Video and/or Audio Decompression and/or Compression Device That Shares a Memory Interface. The U.S. patents and applications cited above are incorporated herein by reference as if set forth in their entirety.

These and other changes can be made to the invention in light of the above detailed description. In general, in the following claims, the terms should not be construed to limit the invention to the specific embodiments disclosed in the specification and claims, but should be construed to include all apparatus and methods for dynamically allocating main memory to provide a large contiguous block of memory to a given application. Accordingly, the invention is not limited by the disclosure, but instead its scope is to be determined entirely from the following claims.

I claim:

1. In a computer system having a main memory, a storage device having encoded data stored therein and a processor controlled by an operating system, an electronic device comprising:

a decoding circuit coupled to receive and decode the encoded data from the storage device; and a control circuit coupled to the decoding circuit, the processor and the main memory, the control circuit being configured to request continuous use of several portions of the main memory from the operating system, the portions of the main memory having noncontiguous addresses, and being configured to translate the noncontiguous addresses to contiguous addresses of a block of memory, and wherein the decoding circuit is configured to request at least some of the contiguous addresses of the block of memory, and wherein the control circuit translates the requested contiguous addresses of the block of memory to requested noncontiguous addresses and permits the decoding circuit to access the portions of the main memory.

2. The electronic device of claim 1 wherein the decoding circuit and the control circuit are monolithically integrated.

3. The electronic device of claim 1 wherein the decoding circuit is a video decoding circuit.

4. The electronic device of claim 1 wherein the decoding circuit is an audio decoding circuit.

5. The electronic device of claim 1 wherein the storage device is a DVD player and wherein the decoding circuit is an MPEG 2 decoding circuit.

6. The electronic device of claim 1 wherein the control circuit includes a memory that stores a look up table, the look up table mapping the noncontiguous addresses to the contiguous addresses.

7. The electronic device of claim 1 wherein the control circuit includes a memory management unit that is configured to algorithmically translate the noncontiguous addresses to the contiguous addresses.

8. The electronic device of claim 1 wherein the control circuit includes a direct memory access engine coupled between the main memory and the decoding circuit.

9. The electronic device of claim 1 wherein the control circuit is further configured to release the portions of the main memory to the operating system when the decoding circuit ceases to request the contiguous addresses.

10. In a computer system controlled by an operating system and having a main memory, an electronic device comprising:

a control circuit coupled to the processor and the main memory, the control circuit being configured to request continuous use of several portions of the main memory from the operating system, the memory portions having noncontiguous addresses, and being configured to translate the noncontiguous addresses to contiguous addresses of a block of memory, wherein the control circuit permits access to the portions of the main memory as the block of memory based on the contiguous addresses.

11. The electronic device of claim 10 wherein the main memory and the control circuit are monolithically integrated.

12. The electronic device of claim 10, further comprising a video decoding circuit coupled to the control circuit.

13. The electronic device of claim 10, further comprising an audio decoding circuit coupled to the control circuit.

14. The electronic device of claim 10, further comprising a DVD player and an MPEG2 decoding circuit coupled to the control circuit.

15. The electronic device of claim 10 wherein the control circuit includes a memory that stores a look up table, the look up table translating the noncontiguous addresses to the contiguous addresses.

16. The electronic device of claim 10 wherein the control circuit includes a memory management unit that is configured to translate the noncontiguous addresses to the contiguous addresses.

17. The electronic device of claim 10 wherein the control circuit includes a direct memory access engine coupled to the main memory.

18. The electronic device of claim 10 wherein the control circuit is further configured to release the portions of the main memory to the operating system when the control circuit receives a termination signal from the computer system.

19. A computer system, comprising:

a main memory;

a storage device having encoded data stored therein;

a processor coupled to the main memory and the storage device and controlled by an operating system; and a control circuit coupled to the processor and the main memory, the control circuit being configured to request continuous use of several portions of the main memory from the operating system, the memory portions having noncontiguous addresses, and being configured to translate the noncontiguous addresses to contiguous addresses of a block of memory, wherein the control circuit permits access to the portions of the main memory through the block of memory based on the contiguous addresses.

20. The computer system of claim 19, further comprising a video decoding circuit coupled to the control circuit.

21. The computer system of claim 19, further comprising an audio decoding circuit coupled to the control circuit.

22. The computer system of claim 19 wherein the control circuit includes a memory management unit that is configured to algorithmically translate the noncontiguous addresses to the contiguous addresses.

23. The computer system of claim 19 wherein the control circuit includes a direct memory access engine coupled to the main memory.

24. The computer system of claim 19 wherein the control circuit is further configured to release the portions of the main memory to the operating system when the control circuit receives a termination signal from the processor.

25. In a computer system having a processor controlled by an operating system and having a main memory, a storage device having encoded data stored therein, a decoding circuit coupled to receive and decode the encoded data from the storage device, and a control circuit coupled to the decoding circuit, the processor, and the main memory, the control circuit using a memory management method comprising the steps of:

requesting contiguous use of several portions of the main memory from the operating system, the portions of the main memory having noncontiguous addresses;

translating the noncontiguous addresses to contiguous addresses of a block of memory;

receiving requests for access to a block of memory from the decoding circuit;

translating the contiguous addresses to the noncontiguous addresses; and providing access to the portions of the main memory as the block of memory for the decoding circuit.

26. The method of claim 25 wherein the encoded data is video data, and wherein the method further includes the step of decoding the video data.

27. The method of claim 25 wherein the encoded data is audio data, and wherein the method further includes the step of decoding the audio data.

28. The method of claim 25 wherein the storage device is a DVD player that produces video data, and wherein the method further includes the step of decoding the video data under an MPEG2 decoding routine.

29. The method of claim 25 wherein the step of translating includes the step of forming a look up table, the look up table translating the noncontiguous addresses to the contiguous addresses.

30. The method of claim 25 wherein the step of providing access to the portions of the main memory includes the step of employing direct memory access instructions to couple the decoding circuit to the portions of the main memory.

31. The method of claim 25, further comprising the steps of:

receiving an instruction to terminate decoding; and releasing the several memory portions of the main memory to the operating system.

32. In a computer system having a processor controlled by an operating system, having a main memory and a control circuit using a memory management method comprising the steps of:

requesting continuous use of several portions of the main memory from the operating system, the portions of the main memory having noncontiguous addresses;

translating the noncontiguous addresses to contiguous addresses of a block of memory;

receiving requests for access to a block of memory; and translating the contiguous addresses to the noncontiguous addresses.

33. The method of claim 32 wherein the computer system includes a decoding circuit coupled to the main memory, and wherein the method includes the step of providing access to the portions of the main memory as the block of memory for the decoding circuit based on the contiguous addresses.

34. The method of claim 32 wherein the computer system includes an MPEG2 video decoding circuit coupled to the main memory, and wherein the method includes the step of providing access to the portions of the main memory as the block of memory for the video decoding circuit based on the contiguous addresses.

35. The method of claim 32 wherein the computer system includes an audio decoding circuit coupled to the main memory, and wherein the method includes the step of providing access to the portions of the main memory as the block of memory for the audio decoding circuit based on the contiguous addresses.

36. The method of claim 32 wherein the computer system includes a software application operable under the operating system, and wherein the method includes the step of providing access to the portions of the main memory as the block of memory for the software application based on the contiguous addresses.

37. The method of claim 32 wherein the step of translating includes the step of forming a look up table, the look up table translating the noncontiguous addresses to the contiguous addresses.

38. The method of claim 32 wherein the computer system includes a software application operable under the operating system, and wherein the method includes the step of providing access to the portions of the main memory by employing direct memory access instructions to provide access to the portions of the main memory as the block of memory for the software application.

39. The method of claim 32 wherein the computer system includes a decoding circuit coupled to the main memory, and wherein the method includes the step of providing access to the portions of the main memory by employing direct memory access instructions to provide access to the portions of the main memory as the block of memory for the decoding circuit.

40. The method of claim 32, further comprising the steps of:

receiving a termination instruction; and releasing the several memory portions of the main memory to the operating system.

* * * * *